(12) United States Patent
Chen et al.

(10) Patent No.: US 11,155,154 B1
(45) Date of Patent: Oct. 26, 2021

(54) MULTI-PUMP DRIVEN SINGLE-MOTOR HYDRO-MECHANICAL HYBRID TRANSMISSION DEVICE AND CONTROL METHOD THEREOF

(71) Applicant: JIANGSU UNIVERSITY, Zhenjiang (CN)

(72) Inventors: Long Chen, Zhenjiang (CN); Zhen Zhu, Zhenjiang (CN); Yingfeng Cai, Zhenjiang (CN); Xiang Tian, Zhenjiang (CN); Changgao Xia, Zhenjiang (CN); Falin Zeng, Zhenjiang (CN); Jiajia Wang, Zhenjiang (CN); Dehua Shi, Zhenjiang (CN); Chaochun Yuan, Zhenjiang (CN); Xiaodong Sun, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/276,157

(22) PCT Filed: Feb. 26, 2020

(86) PCT No.: PCT/CN2020/076687
§ 371 (c)(1),
(2) Date: Mar. 15, 2021

(87) PCT Pub. No.: WO2021/159559
PCT Pub. Date: Aug. 19, 2021

(30) Foreign Application Priority Data

Feb. 15, 2020 (CN) .......................... 202010094295.9

(51) Int. Cl.
*F16H 47/04* (2006.01)
*B60K 6/48* (2007.10)
*F16H 47/02* (2006.01)

(52) U.S. Cl.
CPC .......... *B60K 6/48* (2013.01); *F16H 2047/025* (2013.01); *F16H 2047/045* (2013.01)

(58) Field of Classification Search
None
See application file for complete search history.

(56) References Cited

U.S. PATENT DOCUMENTS

2011/0015022 A1 1/2011 Stoeckl et al.

FOREIGN PATENT DOCUMENTS

| CN | 202510651 U | 10/2012 |
| CN | 105531506 A | 4/2016 |

(Continued)

*Primary Examiner* — Dirk Wright
(74) *Attorney, Agent, or Firm* — Bayramoglu Law Offices LLC (57) ABSTRACT

A multi-pump driven single-motor hydro-mechanical hybrid transmission device includes an input shaft, a planetary gear split mechanism, a hydraulic transmission system, a planetary gear convergence mechanism, and an output shaft. The input shaft is connected to the hydraulic transmission system and the planetary gear convergence mechanism through the planetary gear split mechanism. The hydraulic transmission system and the planetary gear convergence mechanism are both connected to the output shaft. The hydraulic transmission system includes a multi-pump driving mechanism, a fixed displacement motor mechanism, and a hydraulic transmission output mechanism. The multi-pump driving mechanism is connected to the fixed displacement motor mechanism. The fixed displacement motor mechanism is connected to the planetary gear convergence mechanism and is connected to the output shaft through the hydraulic transmission output mechanism.

6 Claims, 2 Drawing Sheets

(56) References Cited

FOREIGN PATENT DOCUMENTS

| | | | | |
|---|---|---|---|---|
| CN | 205524229 U | 8/2016 | | |
| CN | 205533478 U | 8/2016 | | |
| CN | 207598844 U | 7/2018 | | |
| CN | 109723789 A | 5/2019 | | |
| DE | 102014107333 A1 | 10/2015 | | |
| JP | 2003193956 A | * | 7/2003 | ............. F03D 15/10 |
| WO | WO-2008128865 A1 | * | 10/2008 | ............. F16H 47/04 |
| WO | WO-2016063103 A1 | * | 4/2016 | ........... F16H 61/444 |

* cited by examiner

FIG. 1

| Transmission type | Direction | Function (mode) | Gear-shift component | | | | | | | | | | | | | |
|---|---|---|---|---|---|---|---|---|---|---|---|---|---|---|---|---|
| | | | $C_1$ | $C_2$ | $C_3$ | $C_4$ | $C_5$ | $C_6$ | $C_7$ | $C_8$ | $B_1$ | $P_1$ | $P_2$ | $P_3$ | $P_4$ | $V_4$ |
| Hydraulic transmission | Forward | Low-speed fine regulation (a) | ▲ | | | | | | | | | | | | △ | Right |
| | | Medium-speed regulation (b) | | △ | | | | | | | | | | △ | ▲ | Right |
| | | High-speed coarse regulation (c) | | | △ | ▲ | △ | △ | △ | ▲ | | | △ | | △ | Right |
| | Reverse | Low-speed fine regulation (d) | | | | | | | | | △ | | | ▲ | △ | Left |
| | | Medium-speed regulation (e) | | | | | | | | | | | | △ | ▲ | Left |
| | | High-speed coarse regulation (f) | | | △ | ▲ | ▲ | △ | △ | △ | | | | ▲ | ▲ | Left |
| Hydro-mechanical split transmission | Forward | Low-speed fine regulation (g) | △ | △ | ▲ | | | ▲ | ▲ | | | △ | △ | △ | ▲ | Right |
| | | High-speed coarse regulation (h) | | ▲ | ▲ | ▲ | | ▲ | △ | △ | △ | △ | △ | △ | ▲ | Right |
| | Reverse | Low-speed fine regulation (i) | | ▲ | △ | | △ | △ | ▲ | △ | | △ | ▲ | △ | △ | Right |
| | | High-speed coarse regulation (j) | | ▲ | △ | | | ▲ | △ | | | ▲ | ▲ | △ | △ | Right |
| Hydro-mechanical convergence transmission | Forward | Low-speed fine regulation (k) | ▲ | △ | ▲ | ▲ | | △ | ▲ | △ | △ | | | △ | ▲ | Right |
| | | High-speed coarse regulation (l) | | △ | ▲ | | △ | ▲ | △ | | △ | | △ | ▲ | ▲ | Right |
| | Reverse | Low-speed fine regulation (m) | | ▲ | △ | | | △ | ▲ | | | | | ▲ | △ | Left |
| | | High-speed coarse regulation (n) | | ▲ | △ | | | ▲ | △ | △ | | | | ▲ | ▲ | Left |
| Mechanical transmission | Forward | Low-speed (o) | ▲ | △ | ▲ | △ | | △ | ▲ | △ | | | △ | | | Middle |
| | | High-speed (p) | | | | | | | | | ▲ | | | | | Middle |

Note: ▲ indicates that the gear-shift component is in a working state, and △ indicates that the gear-shift component is in a non-working state.

FIG. 2

MULTI-PUMP DRIVEN SINGLE-MOTOR HYDRO-MECHANICAL HYBRID TRANSMISSION DEVICE AND CONTROL METHOD THEREOF

CROSS REFERENCE TO THE RELATED APPLICATIONS

This application is the national phase entry of International Application No. PCT/CN2020/076687, filed on Feb. 26, 2020, which is based upon and claims priority to Chinese Patent Application No. 202010094295.9, filed on Feb. 15, 2020, the entire contents of which are incorporated herein by reference.

TECHNICAL FIELD

The present invention relates to a transmission device and a control method thereof, and in particular, to a multi-pump driven single-motor hydro-mechanical hybrid transmission device and a control method thereof which take both speed regulation range and speed regulation accuracy into account and belong to the technical field of vehicle transmission.

BACKGROUND

Hydraulic transmission that features flexibility is suitable for startup, hydro-mechanical transmission that features efficient stepless speed regulation is suitable for operation, and mechanical transmission that features efficient speed variation is suitable for transfer. A hydro-mechanical hybrid transmission device integrating hydraulic transmission, hydro-mechanical transmission, and mechanical transmission has high application values.

Hydro-mechanical transmission features both stepless speed regulation and efficient speed variation, which directly determines the performance of a transmission device. A hydro-mechanical hybrid transmission device can implement efficient stepless speed variation by improving design schemes and design parameters of a split mechanism, a convergence mechanism, a mechanical transmission mechanism, and a hydraulic transmission mechanism. For example, hydro-mechanical transmission becomes diversified through combination of planetary gear split and planetary gear convergence manners, gears are increased by replacing a simple mechanical transmission mechanism with a multi-speed gearbox, and the accuracy of a displacement ratio is improved and the range thereof is expanded by adding functions of the hydraulic transmission mechanism. In short, a hydro-mechanical hybrid transmission device that integrates multiple transmission types and has multiple modes is a feasible solution for improving the performance of such a mechanical-electrical-hydraulic integration system.

SUMMARY

Objective of the invention: To eliminate the defects in the prior art, the present invention provides a multi-pump driven single-motor hydro-mechanical hybrid transmission device and a control method thereof. The present invention integrates hydraulic transmission, hydro-mechanical transmission, and mechanical transmission, wherein hydro-mechanical transmission is subdivided into hydro-mechanical split transmission and hydro-mechanical convergence transmission, and employs a multi-pump driven single-motor hydraulic system to implement functions such as multi-mode forward or reverse low-speed fine regulation and high-speed coarse regulation.

Technical solution: A multi-pump driven single-motor hydro-mechanical hybrid transmission device includes an input shaft, a planetary gear split mechanism, a hydraulic transmission system, a planetary gear convergence mechanism, and an output shaft, wherein the input shaft is connected to the hydraulic transmission system and the planetary gear convergence mechanism through the planetary gear split mechanism, and the hydraulic transmission system and the planetary gear convergence mechanism are both connected to the output shaft; the hydraulic transmission system includes a multi-pump driving mechanism, a fixed displacement motor mechanism, and a hydraulic transmission output mechanism, wherein the multi-pump driving mechanism is connected to the fixed displacement motor mechanism, the fixed displacement motor mechanism is connected to the planetary gear convergence mechanism, and the fixed displacement motor mechanism is connected to the output shaft through the hydraulic transmission output mechanism. The present invention is a multi-mode hydro-mechanical hybrid transmission device that integrates hydraulic transmission, hydro-mechanical transmission, and mechanical transmission and meets the requirements of different working conditions; the multi-pump driven single-motor hydraulic system is employed to meet the requirements of different working conditions such as the direction change of an input speed of a pump and the change of a displacement ratio and the direction related thereto; and the system where multiple pumps work in turn can be used to obtain multiple flow combinations and prolong the use and maintenance cycle of the hydraulic system.

Preferably, to adapt to inputs in different directions of a hydraulic pump, the multi-pump driving mechanism includes two groups of variable displacement pump driving mechanisms that are connected in parallel and have opposite input directions, wherein the variable displacement pump driving mechanisms include a first forward input variable displacement pump driving mechanism, a second forward input variable displacement pump driving mechanism, a first reverse input variable displacement pump driving mechanism, and a second reverse input variable displacement pump driving mechanism; a reversing valve $V_4$ is arranged between the multi-pump driving mechanism and the fixed displacement motor mechanism.

Preferably, to implement collaborative control of the variable displacement pump driving mechanism, the first forward input variable displacement pump driving mechanism includes a variable displacement pump $P_1$, a check valve $V_{31}$, a pilot-operated relief valve $V_{21}$, and a solenoid valve $V_{11}$, wherein the solenoid valve $V_{11}$ controls a control pressure of the pilot-operated relief valve $V_{21}$, and the variable displacement pump $P_1$ is connected to the reversing valve $V_4$ through the check valve $V_{31}$;

the second forward input variable displacement pump driving mechanism includes a variable displacement pump $P_2$, a check valve $V_{32}$, a pilot-operated relief valve $V_{22}$, and a solenoid valve $V_{12}$, wherein the solenoid valve $V_{12}$ controls a control pressure of the pilot-operated relief valve $V_{22}$, and the variable displacement pump $P_2$ is connected to the reversing valve $V_4$ through the check valve $V_{32}$;

the first reverse input variable displacement pump driving mechanism includes a variable displacement pump $P_3$, a check valve $V_{33}$, a pilot-operated relief valve $V_{23}$, and a solenoid valve $V_{13}$, wherein the solenoid valve $V_{13}$ controls a control pressure of the pilot-operated relief valve $V_{23}$, and the variable displacement pump $P_3$ is connected to the reversing valve $V_4$ through the check valve $V_{33}$;

the second reverse input variable displacement pump driving mechanism includes a variable displacement pump $P_4$, a check valve $V_{34}$, a pilot-operated relief valve $V_{24}$, and a solenoid valve $V_{14}$, wherein the solenoid valve $V_{14}$ controls a control pressure of the pilot-operated relief valve $V_{24}$, and the variable displacement pump $P_4$ is connected to the reversing valve $V_4$ through the check valve $V_{34}$.

To meet the requirements of low-speed fine regulation and high-speed coarse regulation in each mode, the displacement adjustment range and the input direction of each variable displacement pump in the variable displacement pump driving mechanism are different, and the corresponding check valve, pilot-operated relief valve, and solenoid valve have different parameters.

Preferably, to implement hybrid transmission of mechanical transmission and hydraulic transmission, a jackshaft is arranged between the planetary gear split mechanism and the planetary gear convergence mechanism;

the planetary gear split mechanism includes a split mechanism front-sun gear, a split mechanism front-planet carrier, a split mechanism rear-sun gear, a split mechanism rear-planet carrier, and a split mechanism shared ring gear, wherein the input shaft is connected to the split mechanism front-sun gear and the split mechanism rear-planet carrier; a clutch $C_1$ is arranged between the split mechanism rear-planet carrier and the split mechanism rear-sun gear; a clutch $C_2$ is arranged between the split mechanism front-planet carrier and the jackshaft; a clutch $C_3$ is arranged between the split mechanism rear-sun gear and the jackshaft; and a clutch $C_4$ is arranged between the split mechanism shared ring gear and the hydraulic transmission system;

the planetary gear convergence mechanism includes a convergence mechanism shared sun gear, a convergence mechanism front-planet carrier, a convergence mechanism front-ring gear, a convergence mechanism rear-planet carrier, and a convergence mechanism rear-ring gear, wherein the jackshaft is connected to the convergence mechanism front-planet carrier, and the convergence mechanism front-planet carrier is connected to the convergence mechanism rear-ring gear; a clutch $C_5$ is arranged between the jackshaft and the convergence mechanism shared sun gear; a clutch $C_6$ is arranged between the convergence mechanism front-ring gear and the output shaft; and a clutch $C_7$ is arranged between the convergence mechanism rear-planet carrier and the output shaft;

a clutch $C_8$ is arranged between the hydraulic transmission output mechanism and the output shaft;

a brake $B_1$ is arranged between the fixed displacement motor mechanism and the hydraulic transmission output mechanism.

Preferably, to implement control over multi-pump driven single-motor hydro-mechanical hybrid transmission, a control method of the multi-pump driven single-motor hydro-mechanical hybrid transmission device is as follows:

switching among forward or reverse and high or low speed transmission modes of four transmission types including hydraulic transmission, hydro-mechanical split transmission, hydro-mechanical convergence transmission, and mechanical transmission is implemented through selection of the clutches, the brake, and the variable displacement pumps and combination control of the reversing valve;

in hydraulic transmission, the clutch $C_1$, the clutch $C_4$, and the clutch $C_8$ are engaged while the clutch $C_2$, the clutch $C_3$, the clutch $C_5$, the clutch $C_6$, the clutch $C_7$, and the brake $B_1$ are disengaged; power passes through the input shaft, the planetary gear split mechanism, and the hydraulic transmission system and is output from the output shaft; when the clutch $C_1$ is engaged, the split mechanism rear-planet carrier and the split mechanism rear-sun gear of the planetary gear split mechanism are interlocked, the split mechanism rear-planet carrier and the split mechanism rear-sun gear rotate as a whole, and power is transmitted through the split mechanism shared ring gear to the clutch $C_4$; and when the clutch $C_4$ is engaged, power is transmitted through the clutch $C_4$ to the multi-pump driving mechanism, the fixed displacement motor mechanism, and the hydraulic transmission output mechanism of the hydraulic transmission system, and is finally transmitted through the clutch $C_8$ and output from the output shaft;

in hydro-mechanical split transmission, the clutch $C_4$ and the clutch $C_5$ are engaged while the clutch $C_1$, the clutch $C_8$, and the brake $B_1$ are disengaged; power passes through the input shaft to the planetary gear split mechanism and is split at the planetary gear split mechanism into the hydraulic transmission system and the jackshaft, and the two parts of the power are converged at the planetary gear convergence mechanism and then output from the output shaft;

in hydro-mechanical convergence transmission, the clutch $C_1$ and the clutch $C_4$ are engaged while the clutch $C_5$, the clutch $C_8$, and the brake $B_1$ are disengaged; power passes through the input shaft to the planetary gear split mechanism and is split at the planetary gear split mechanism into the hydraulic transmission system and the jackshaft, and the two parts of the power are converged at the planetary gear convergence mechanism and then output from the output shaft;

in mechanical transmission, the clutch $C_1$ and the brake $B_1$ are engaged while the clutch $C_4$, the clutch $C_5$, and the clutch $C_8$ are disengaged, and the reversing valve $V_4$ is in a middle position; power sequentially passes through the input shaft, the planetary gear split mechanism, the jackshaft, and the planetary gear convergence mechanism and is then output from the output shaft.

Preferably, to implement staged speed regulation and forward switching of hydraulic transmission, in hydraulic transmission, the reversing valve $V_4$ is switched to a right position during forward transmission; the reversing valve $V_4$ is switched to a left position during reverse transmission; the first reverse input variable displacement pump driving mechanism is switched on during low-speed fine regulation; the second reverse input variable displacement pump driving mechanism is switched on during medium-speed regulation; and the first reverse input variable displacement pump driving mechanism and the second reverse input variable displacement pump driving mechanism are both switched on during high-speed coarse regulation.

Preferably, to implement staged speed regulation and forward switching of hydro-mechanical split transmission, in hydro-mechanical split transmission, the reversing valve $V_4$ is switched to the right position; the clutch $C_3$ is engaged and the clutch $C_2$ is disengaged during forward transmission; the clutch $C_2$ is engaged and the clutch $C_3$ is disengaged during reverse transmission; the clutch $C_7$ is engaged and the clutch $C_6$ is disengaged during low-speed fine regulation; the clutch $C_6$ is engaged and the clutch $C_7$ is disengaged during high-speed coarse regulation; the second reverse input variable displacement pump driving mechanism is switched on during forward low-speed fine regulation; the first reverse input variable displacement pump driving mechanism and the second reverse input variable displacement pump driving mechanism are both switched on during forward high-speed coarse regulation; the second forward input variable displacement pump driving mechanism is switched on during reverse low-speed fine regulation; and the first forward input variable displacement pump driving mechanism and the second forward input variable displacement pump driving mechanism are both switched on during reverse high-speed coarse regulation.

Preferably, to implement staged speed regulation and forward switching of hydro-mechanical convergence transmission, in hydro-mechanical convergence transmission, the reversing valve $V_4$ is switched to the right position, the clutch $C_3$ is engaged, and the clutch $C_2$ is disengaged during forward transmission; the reversing valve $V_4$ is switched to the left position, the clutch $C_2$ is engaged, and the clutch $C_3$ is disengaged during reverse transmission; the first reverse input variable displacement pump driving mechanism is switched on, the clutch $C_7$ is engaged, and the clutch $C_6$ is disengaged during low-speed fine regulation; and the first reverse input variable displacement pump driving mechanism and the second reverse input variable displacement pump driving mechanism are both switched on, the clutch $C_6$ is engaged, and the clutch $C_7$ is disengaged during high-speed coarse regulation.

Preferably, to implement staged speed regulation and forward switching of mechanical transmission, in mechanical transmission, the clutch $C_3$ is engaged and the clutch $C_2$ is disengaged during forward transmission, the clutch $C_2$ is engaged and the clutch $C_3$ is disengaged during reverse transmission; the clutch $C_7$ is engaged and the clutch $C_6$ is disengaged during low-speed transmission; and the clutch $C_6$ is engaged and the clutch $C_7$ is disengaged during high-speed transmission.

Beneficial effects: 1. The present invention is a multi-mode hydro-mechanical hybrid transmission device that integrates hydraulic transmission, hydro-mechanical transmission, and mechanical transmission and meets the requirements of different working conditions; 2. the multi-pump driven single-motor hydraulic system is employed to meet the requirements of different working conditions such as the direction change of an input speed of a pump and the change of a displacement ratio and the direction related thereto, and the system where multiple pumps work in turn can be used to obtain multiple flow combinations and prolong the use and maintenance cycle of the hydraulic system; 3. nonlinear full-range speed regulation involving the reciprocal of a transmission ratio and a displacement ratio is implemented through hydro-mechanical split transmission, and linear staged stepless speed variation involving the reciprocal of a transmission ratio and a displacement ratio is implemented through combination of hydraulic transmission, hydro-mechanical convergence transmission, and mechanical transmission, to meet the requirements of different working environments; 4. solutions of low-speed fine regulation and high-speed coarse regulation are provided in each transmission type, and each solution has forward and reverse situations, to meet the requirements on speed regulation range and speed regulation accuracy of different modes in the same type.

DETAILED DESCRIPTION OF THE EMBODIMENTS

The present invention is further described below with reference to the accompanying drawings and specific embodiments, but the protection scope of the present invention is not limited thereto.

Figure 1:
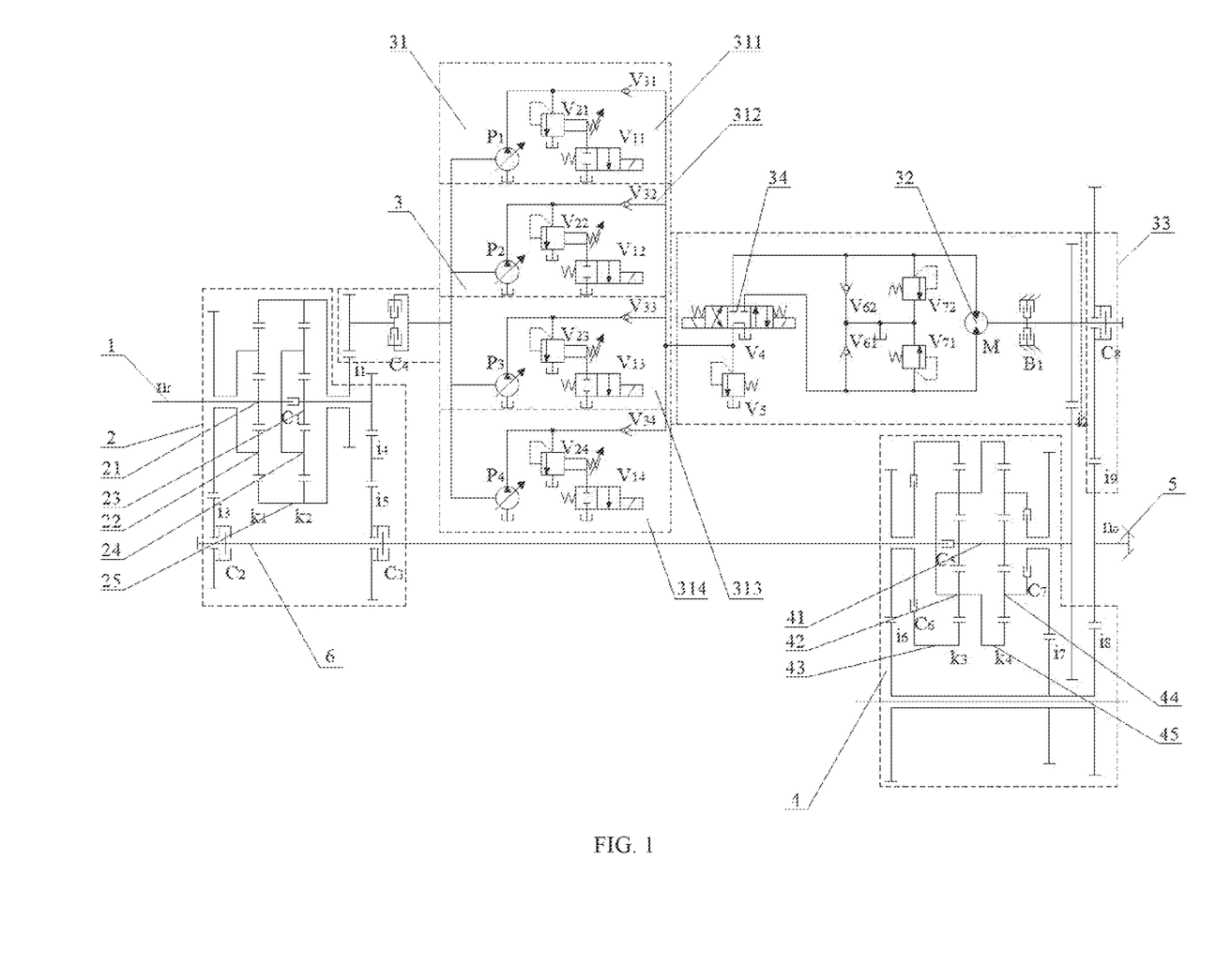
FIG. 1 is a schematic structural diagram of the present invention.

As shown in FIG. 1, a multi-pump driven single-motor hydro-mechanical hybrid transmission device includes an input shaft 1, a planetary gear split mechanism 2, a hydraulic transmission system 3, a planetary gear convergence mechanism 4, and an output shaft 5. The input shaft 1 is connected to the hydraulic transmission system 3 and the planetary gear convergence mechanism 4 through the planetary gear split mechanism 2, and the hydraulic transmission system 3 and the planetary gear convergence mechanism 4 are both connected to the output shaft 5. The hydraulic transmission system 3 includes a multi-pump driving mechanism 31, a fixed displacement motor mechanism 32, and a hydraulic transmission output mechanism 33. The multi-pump driving mechanism 31 is connected to the fixed displacement motor mechanism 32, the fixed displacement motor mechanism 32 is connected to the planetary gear convergence mechanism 4, and the fixed displacement motor mechanism 32 is connected to the output shaft 5 through the hydraulic transmission output mechanism 33.

The multi-pump driving mechanism 31 includes a first forward input variable displacement pump driving mechanism 311, a second forward input variable displacement pump driving mechanism 312, a first reverse input variable displacement pump driving mechanism 313, and a second reverse input variable displacement pump driving mechanism 314. A reversing valve $V_4$ 34 is arranged between the multi-pump driving mechanism 31 and the fixed displacement motor mechanism 32.

The first forward input variable displacement pump driving mechanism 311 includes a variable displacement pump $P_1$, a check valve $V_{31}$, a pilot-operated relief valve $V_{21}$, and a solenoid valve $V_{11}$. The solenoid valve $V_{11}$ controls a control pressure of the pilot-operated relief valve $V_{21}$, and the variable displacement pump $P_1$ is connected to the reversing valve $V_4$ 34 through the check valve $V_3$.

The second forward input variable displacement pump driving mechanism 312 includes a variable displacement pump $P_2$, a check valve $V_{32}$, a pilot-operated relief valve $V_{22}$, and a solenoid valve $V_{12}$. The solenoid valve $V_{12}$ controls a control pressure of the pilot-operated relief valve $V_{22}$, and the variable displacement pump $P_2$ is connected to the reversing valve $V_4$ 34 through the check valve $V_{32}$.

The first reverse input variable displacement pump driving mechanism 313 includes a variable displacement pump $P_3$, a check valve $V_{33}$, a pilot-operated relief valve $V_{23}$, and a solenoid valve $V_{13}$. The solenoid valve $V_{13}$ controls a control pressure of the pilot-operated relief valve $V_2$, and the variable displacement pump $P_3$ is connected to the reversing valve $V_4$ 34 through the check valve $V_{33}$.

The second reverse input variable displacement pump driving mechanism 314 includes a variable displacement pump $P_4$, a check valve $V_{34}$, a pilot-operated relief valve $V_{24}$, and a solenoid valve $V_{14}$. The solenoid valve $V_{14}$ controls a control pressure of the pilot-operated relief valve $V_{24}$, and the variable displacement pump $P_4$ is connected to the reversing valve $V_4$ 34 through the check valve $V_{34}$.

A jackshaft 6 is arranged between the planetary gear split mechanism 2 and the planetary gear convergence mechanism 4.

The planetary gear split mechanism 2 includes a split mechanism front-sun gear 21, a split mechanism front-planet carrier 22, a split mechanism rear-sun gear 23, a split mechanism rear-planet carrier 24, and a split mechanism shared ring gear 25. The input shaft 1 is connected to the split mechanism front-sun gear 21 and the split mechanism rear-planet carrier 24. A clutch $C_1$ is arranged between the split mechanism rear-planet carrier 24 and the split mechanism rear-sun gear 23. A clutch $C_2$ is arranged between the split mechanism front-planet carrier 22 and the jackshaft 6. A clutch $C_3$ is arranged between the split mechanism rear-sun gear 23 and the jackshaft 6. A clutch $C_4$ is arranged between the split mechanism shared ring gear 25 and the hydraulic transmission system 3.

The planetary gear convergence mechanism 4 includes a convergence mechanism shared sun gear 41, a convergence mechanism front-planet carrier 42, a convergence mechanism front-ring gear 43, a convergence mechanism rear-planet carrier 44, and a convergence mechanism rear-ring gear 45. The jackshaft 6 is connected to the convergence mechanism front-planet carrier 42, and the convergence mechanism front-planet carrier 42 is connected to the convergence mechanism rear-ring gear 45. A clutch $C_5$ is arranged between the jackshaft 6 and the convergence mechanism shared sun gear 41. A clutch $C_6$ is arranged between the convergence mechanism front-ring gear 43 and the output shaft 5. A clutch $C_7$ is arranged between the convergence mechanism rear-planet carrier 44 and the output shaft 5.

A clutch $C_8$ is arranged between the hydraulic transmission output mechanism 33 and the output shaft 5.

A brake $B_1$ is arranged between the fixed displacement motor mechanism 32 and the hydraulic transmission output mechanism 33.

Figure 2:
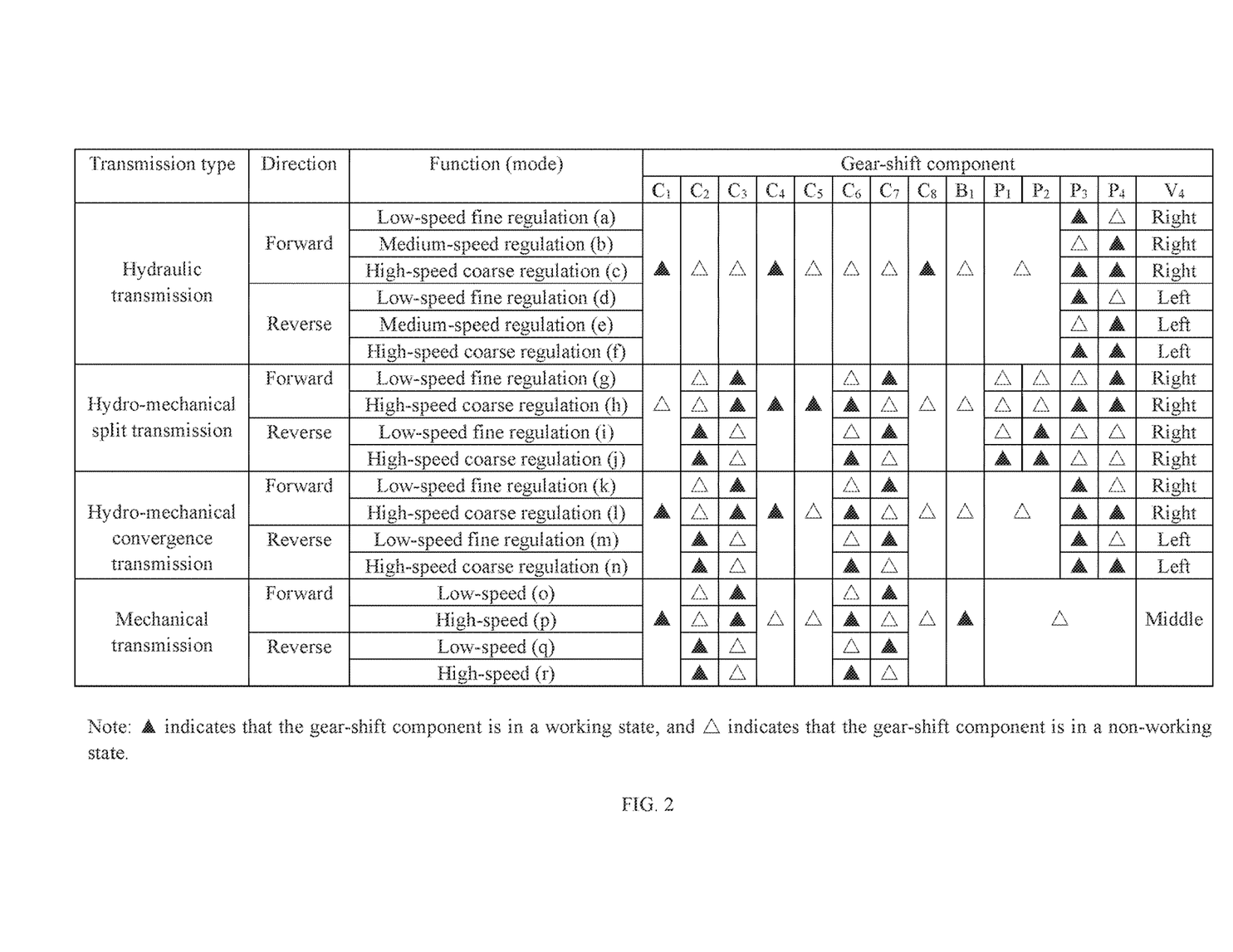
FIG. 2 is a table showing engagement/disengagement states of mode-switching components in the present invention.

As shown in FIG. 2, a control method of the multi-pump driven single-motor hydro-mechanical hybrid transmission device implements switching among forward or reverse and high or low speed transmission modes of four transmission types including hydraulic transmission, hydro-mechanical split transmission, hydro-mechanical convergence transmission, and mechanical transmission through selection of the clutches, the brake, and the variable displacement pumps and combination control of the reversing valve.

In a transmission mode of forward hydraulic low-speed fine regulation, the clutch $C_1$, the clutch $C_4$, and the clutch $C_5$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to a right position, and the first reverse input variable displacement pump driving mechanism 313 is switched on; power passes through the input shaft 1, the planetary gear split mechanism 2, the first reverse input variable displacement pump driving mechanism 313, the right position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [0, 0.5] \tag{1}$$

wherein $n_o$ is an output speed, $n_I$ is an input speed, e is a displacement ratio of the hydraulic system, and i is a transmission ratio of a related gear pair.

In a transmission mode of forward hydraulic medium-speed regulation, the clutch $C_1$, the clutch $C_4$, and the clutch $C_8$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to the right position, and the second reverse input variable displacement pump driving mechanism 314 is switched on; power passes through the input shaft 1, the planetary gear split mechanism 2, the second reverse input variable displacement pump driving mechanism 314, the right position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [0, 1.0]. \tag{2}$$

In a transmission mode of forward hydraulic high-speed coarse regulation, the clutch $C_1$, the clutch $C_4$, and the clutch $C_8$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to the right position, and the first reverse input variable displacement pump driving mechanism 313 and the second reverse input variable displacement pump driving mechanism 314 are both switched on; power passes through the input shaft 1, the planetary gear split mechanism 2, the first reverse input variable displacement pump driving mechanism 313 and the second reverse input variable displacement pump driving mechanism 314, the right position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [0, 1.5]. \tag{3}$$

In a transmission mode of reverse hydraulic low-speed fine regulation, the clutch $C_1$, the clutch $C_4$, and the clutch $C_5$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to a left position, and the first reverse input variable displacement pump driving mechanism 313 is switched on; power passes through the input shaft 1, the planetary gear split mechanism 2, the first reverse input variable displacement pump driving mechanism 313, the left position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [-0.5, 0]. \tag{4}$$

In a transmission mode of reverse hydraulic medium-speed regulation, the clutch $C_1$, the clutch $C_4$, and the clutch $C_5$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to the left position, and the second reverse input variable displacement pump driving mechanism 314 is switched on; power passes through the input shaft 1, the planetary gear split mechanism 2, the second reverse input variable displacement pump driving mechanism 314, the left position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [-1.0, 0]. \quad (5)$$

In a transmission mode of reverse hydraulic high-speed coarse regulation, the clutch $C_1$, the clutch $C_4$, and the clutch $C_5$ are engaged while the clutch $C_2$, the clutch $C_3$, the clutch $C_5$, the clutch $C_6$, the clutch $C_7$, and the brake $B_1$ are disengaged, the reversing valve $V_4$ 34 is switched to the left position, and the first reverse input variable displacement pump driving mechanism 313 and the second reverse input variable displacement pump driving mechanism 314 are both switched on; power passes through the input shaft 1, the planetary gear split mechanism 2, the first reverse input variable displacement pump driving mechanism 313 and the second reverse input variable displacement pump driving mechanism 314, the left position of the reversing valve $V_4$ 34, the fixed displacement motor mechanism 32, and the hydraulic transmission output mechanism 33 and is output from the output shaft 5; in this case, the input-output relationship satisfies the following formula:

$$n_o = \frac{e}{i_1 i_9} n_I, e \in [-1.5, 0]. \quad (6)$$

In a transmission mode of forward hydro-mechanical split low-speed fine regulation, the clutch $C_3$, the clutch $C_4$, the clutch $C_5$, and the clutch $C_7$ are engaged while the clutch $C_1$, the clutch $C_2$, the clutch $C_6$, the clutch $C_5$, and the brake $B_1$ are disengaged, the reversing valve $V_4$ 34 is switched to the right position, and the second reverse input variable displacement pump driving mechanism 314 is switched on; thereby, the planetary gear convergence mechanism 4 is fixedly connected as a whole, and power passes through the input shaft 1 to the split mechanism rear-planet carrier 23 and is split into two parts: one part of the power is transmitted through the split mechanism shared ring gear 25, the clutch $C_4$, the second reverse input variable displacement pump driving mechanism 314, the right position of the reversing valve $V_4$ 34, and the fixed displacement motor mechanism 32 to the convergence mechanism shared sun gear 41, while the other part of the power is transmitted through the split mechanism rear-sun gear 23, the clutch $C_3$, and the jackshaft 6 to the convergence mechanism rear-ring gear 45; the two parts of the power are converged at the convergence mechanism rear-planet carrier 44 and then transmitted through the clutch $C_7$ and output from the output shaft 5; in this case, the input-output relationship satisfies the following formula:

$$n_o = \frac{k_2 + 1}{i_4 i_5 i_7 i_8 + \frac{k_2 i_1 i_2 i_7 i_8}{e}} n_I, e \in [0, 1.0] \quad (7)$$

wherein k is a characteristic parameter of a related planetary gear.

In a transmission mode of forward hydro-mechanical split high-speed coarse regulation, the clutch $C_3$, the clutch $C_4$, the clutch $C_5$, and the clutch $C_6$ are engaged while the clutch $C_1$, the clutch $C_2$, the clutch $C_7$, the clutch $C_5$, and the brake $B_1$ are disengaged, the reversing valve $V_4$ 34 is switched to the right position, and the first reverse input variable displacement pump driving mechanism 313 and the second reverse input variable displacement pump driving mechanism 314 are both switched on; thereby, the planetary gear convergence mechanism 4 is fixedly connected as a whole, and power passes through the input shaft 1 to the split mechanism rear-planet carrier 23 and is split into two parts: one part of the power is transmitted through the split mechanism shared ring gear 25, the clutch $C_4$, the first reverse input variable displacement pump driving mechanism 313 and the second reverse input variable displacement pump driving mechanism 314 that are connected in parallel, the right position of the reversing valve $V_4$ 34, and the fixed displacement motor mechanism 32 to the convergence mechanism shared sun gear 41, while the other part of the power is transmitted through the split mechanism rear-sun gear 23, the clutch $C_3$, and the jackshaft 6 to the convergence mechanism front-planet carrier 42; the two parts of the power are converged at the convergence mechanism front-ring gear 43 and then transmitted through the clutch $C_6$ and output from the output shaft 5; in this case, the input-output relationship satisfies the following formula:

$$n_o = -\frac{k_2 + 1}{i_4 i_5 i_6 i_8 + \frac{k_2 i_1 i_2 i_6 i_8}{e}} n_I, e \in [0, 1.5]. \quad (8)$$

In a transmission mode of reverse hydro-mechanical split low-speed fine regulation, the clutch $C_2$, the clutch $C_4$, the clutch $C_5$, and the clutch $C_7$ are engaged while the clutch $C_1$, the clutch $C_3$, the clutch $C_6$, the clutch $C_8$, and the brake $B_1$ are disengaged, the reversing valve $V_4$ 34 is switched to the right position, and the second forward input variable displacement pump driving mechanism 312 is switched on; thereby, the planetary gear convergence mechanism 4 is fixedly connected as a whole, and power passes through the input shaft 1 to the split mechanism front-sun gear 21 and is split into two parts: one part of the power is transmitted through the split mechanism shared ring gear 25, the clutch $C_4$, the second forward input variable displacement pump driving mechanism 312, the right position of the reversing valve $V_4$ 34, and the fixed displacement motor mechanism 32 to the convergence mechanism shared sun gear 41, while the other part of the power is transmitted through the split mechanism front-planet carrier 22, the clutch $C_2$, and the jackshaft 6 to the convergence mechanism rear-ring gear 45; the two parts of the power are converged at the convergence mechanism rear-planet carrier 44 and then transmitted through the clutch $C_7$ and output from the output shaft 5; in this case, the input-output relationship satisfies the following formula:

$$n_o = -\frac{1}{(k_1+1)i_3i_7i_8 + \frac{k_1i_1i_2i_7i_8}{e}}n_I, e \in [0, 1.0]. \quad (9)$$

In a transmission mode of reverse hydro-mechanical split high-speed coarse regulation, the clutch $C_2$, the clutch $C_4$, the clutch $C_5$, and the clutch $C_6$ are engaged while the clutch $C_1$, the clutch $C_3$, the clutch $C_7$, the clutch $C_8$, and the brake $B_1$ are disengaged, the reversing valve $V_4$ 34 is switched to the right position, and the first forward input variable displacement pump driving mechanism 311 and the second forward input variable displacement pump driving mechanism 312 are both switched on; thereby, the planetary gear convergence mechanism 4 is fixedly connected as a whole, and power passes through the input shaft 1 to the split mechanism front-sun gear 21 and is split into two parts: one part of the power is transmitted through the split mechanism shared ring gear 25, the clutch $C_4$, the first forward input variable displacement pump driving mechanism 311 and the second forward input variable displacement pump driving mechanism 312 that are connected in parallel, the right position of the reversing valve $V_4$ 34, and the fixed displacement motor mechanism 32 to the convergence mechanism shared sun gear 41, while the other part of the power is transmitted through the split mechanism front-planet carrier 22, the clutch $C_2$, and the jackshaft 6 to the convergence mechanism front-planet carrier 42; the two parts of the power are converged at the convergence mechanism front-ring gear 43 and then transmitted through the clutch $C_6$ and output from the output shaft 5; in this case, the input-output relationship satisfies the following formula:

$$n_o = -\frac{1}{(k_1+1)i_3i_6i_8 + \frac{k_1i_1i_2i_6i_8}{e}}n_I, e \in [0, 1.5]. \quad (10)$$

In a transmission mode of forward hydro-mechanical convergence low-speed fine regulation, the clutch $C_1$, the clutch $C_3$, the clutch $C_4$, and the clutch $C_7$ are engaged while the clutch $C_2$, the clutch $C_5$, the clutch $C_6$, the clutch $C_8$, and the brake $B_1$ are disengaged, the reversing valve $V_4$ 34 is switched to the right position, and the first reverse input variable displacement pump driving mechanism 313 is switched on; thereby, the planetary gear split mechanism 2 is fixedly connected as a whole, and power passes through the input shaft 1 to the planetary gear split mechanism 2 and is split into two parts: one part of the power is transmitted through the clutch $C_4$, the first reverse input variable displacement pump driving mechanism 313, the right position of the reversing valve $V_4$ 34, and the fixed displacement motor mechanism 32 to the convergence mechanism shared sun gear 41, while the other part of the power is transmitted through the clutch $C_3$ and the jackshaft 6 to the convergence mechanism rear-ring gear 45; the two parts of the power are converged at the convergence mechanism rear-planet carrier 44 and then transmitted through the clutch $C_7$ and output from the output shaft 5; in this case, the input-output relationship satisfies the following formula:

$$n_o = \frac{\frac{k_4}{i_4i_5} + \frac{e}{i_1i_2}}{(k_4+1)i_7i_8}n_I, e \in [0, 0.5]. \quad (11)$$

In a transmission mode of forward hydro-mechanical convergence high-speed coarse regulation, the clutch $C_1$, the clutch $C_3$, the clutch $C_4$, and the clutch $C_6$ are engaged while the clutch $C_2$, the clutch $C_5$, the clutch $C_7$, the clutch $C_8$, and the brake $B_1$ are disengaged, the reversing valve $V_4$ 34 is switched to the right position, and the first reverse input variable displacement pump driving mechanism 313 and the second reverse input variable displacement pump driving mechanism 314 are both switched on; thereby, the planetary gear split mechanism 2 is fixedly connected as a whole, and power passes through the input shaft 1 to the planetary gear split mechanism 2 and is split into two parts: one part of the power is transmitted through the clutch $C_4$, the first reverse input variable displacement pump driving mechanism 313 and the second reverse input variable displacement pump driving mechanism 314 that are connected in parallel, the right position of the reversing valve $V_4$ 34, and the fixed displacement motor mechanism 32 to the convergence mechanism shared sun gear 41, while the other part of the power is transmitted through the clutch $C_3$ and the jackshaft 6 to the convergence mechanism front-planet carrier 42; the two parts of the power are converged at the convergence mechanism front-ring gear 43 and then transmitted through the clutch $C_6$ and output from the output shaft 5; in this case, the input-output relationship satisfies the following formula:

$$n_o = \frac{\frac{k_3+1}{i_4i_5} - \frac{e}{i_1i_2}}{k_3i_6i_8}n_I, e \in [0, 1.5]. \quad (12)$$

In a transmission mode of reverse hydro-mechanical convergence low-speed fine regulation, the clutch $C_1$, the clutch $C_2$, the clutch $C_4$, and the clutch $C_7$ are engaged while the clutch $C_3$, the clutch $C_5$, the clutch $C_6$, the clutch $C_8$, and the brake $B_1$ are disengaged, the reversing valve $V_4$ 34 is switched to the left position, and the first reverse input variable displacement pump driving mechanism 313 is switched on; thereby, the planetary gear split mechanism 2 is fixedly connected as a whole, and power passes through the input shaft 1 to the planetary gear split mechanism 2 and is split into two parts: one part of the power is transmitted through the clutch $C_4$, the first reverse input variable displacement pump driving mechanism 313, the left position of the reversing valve $V_4$ 34, and the fixed displacement motor mechanism 32 to the convergence mechanism shared sun gear 41, while the other part of the power is transmitted through the clutch $C_2$ and the jackshaft 6 to the convergence mechanism rear-ring gear 45; the two parts of the power are converged at the convergence mechanism rear-planet carrier 44 and then transmitted through the clutch $C_7$ and output from the output shaft 5; in this case, the input-output relationship satisfies the following formula:

$$n_o = \frac{-\frac{k_4}{i_3} - \frac{e}{i_1i_2}}{(k_4+1)i_7i_8}n_I, e \in [-0.5, 0]. \quad (13)$$

In a transmission mode of reverse hydro-mechanical convergence high-speed coarse regulation, the clutch $C_1$, the clutch $C_2$, the clutch $C_4$, and the clutch $C_6$ are engaged while the clutch $C_3$, the clutch $C_5$, the clutch $C_7$, the clutch $C_8$, and the brake $B_1$ are disengaged, the reversing valve $V_4$ 34 is switched to the left position, and the first reverse input variable displacement pump driving mechanism 313 and the second reverse input variable displacement pump driving mechanism 314 are both switched on, thereby, the planetary gear split mechanism 2 is fixedly connected as a whole, and power passes through the input shaft 1 to the planetary gear split mechanism 2 and is split into two parts: one part of the power is transmitted through the clutch $C_4$, the first reverse input variable displacement pump driving mechanism 313 and the second reverse input variable displacement pump driving mechanism 314 that are connected in parallel, the left position of the reversing valve $V_4$ 34, and the fixed displacement motor mechanism 32 to the convergence mechanism shared sun gear 41, while the other part of the power is transmitted through the clutch $C_2$ and the jackshaft 6 to the convergence mechanism front-planet carrier 42; the two parts of the power are converged at the convergence mechanism front-ring gear 43 and then transmitted through the clutch $C_6$ and output from the output shaft 5; in this case, the input-output relationship satisfies the following formula:

$$n_o = -\frac{\frac{e}{i_1 i_2} + \frac{k_3 + 1}{i_3}}{k_3 i_6 i_8} n_I, \; e \in [-1.5, 0]. \tag{14}$$

In a forward mechanical low-speed transmission mode, the clutch $C_1$, the clutch $C_3$, the clutch $C_7$, and the brake $B_1$ are engaged while the clutch $C_2$, the clutch $C_4$, the clutch $C_5$, the clutch $C_6$, and the clutch $C_8$ are disengaged, and the reversing valve $V_4$ 34 is in a middle position; power passes through the input shaft 1, the planetary gear split mechanism 2, the clutch $C_3$, the jackshaft 6, the convergence mechanism rear-ring gear 45, the convergence mechanism rear-planet carrier 44, and the clutch $C_7$ and is output from the output shaft 5; in this case, the input-output relationship satisfies the following formula:

$$n_o = \frac{k_4}{(k_4 + 1)i_4 i_5 i_7 i_8} n_I. \tag{15}$$

In a forward mechanical high-speed transmission mode, the clutch $C_1$, the clutch $C_3$, the clutch $C_6$, and the brake $B_1$ are engaged while the clutch $C_2$, the clutch $C_4$, the clutch $C_5$, the clutch $C_7$, and the clutch $C_8$ are disengaged, and the reversing valve $V_4$ 34 is in the middle position; power passes through the input shaft 1, the planetary gear split mechanism 2, the clutch $C_3$, the jackshaft 6, the convergence mechanism front-planet carrier 42, the convergence mechanism front-ring gear 43, and the clutch $C_6$ and is output from the output shaft 5; in this case, the input-output relationship satisfies the following formula:

$$n_o = \frac{k_3 + 1}{k_3 i_4 i_5 i_6 i_8} n_I. \tag{16}$$

In a reverse mechanical low-speed transmission mode, the clutch $C_1$, the clutch $C_2$, the clutch $C_7$, and the brake $B_1$ are engaged while the clutch $C_3$, the clutch $C_4$, the clutch $C_5$, the clutch $C_6$, and the clutch $C_8$ are disengaged, and the reversing valve $V_4$ 34 is in the middle position; power passes through the input shaft 1, the planetary gear split mechanism 2, the clutch $C_2$, the jackshaft 6, the convergence mechanism rear-ring gear 45, the convergence mechanism rear-planet carrier 44, and the clutch $C_7$ and is output from the output shaft 5; in this case, the input-output relationship satisfies the following formula:

$$n_o = -\frac{k_4}{(k_4 + 1)i_3 i_7 i_8} n_I. \tag{17}$$

In a forward mechanical high-speed transmission mode, the clutch $C_1$, the clutch $C_2$, the clutch $C_6$, and the brake $B_1$ are engaged while the clutch $C_3$, the clutch $C_4$, the clutch $C_5$, the clutch $C_7$, and the clutch $C_8$ are disengaged, and the reversing valve $V_4$ 34 is in the middle position; power passes through the input shaft 1, the planetary gear split mechanism 2, the clutch $C_2$, the jackshaft 6, the convergence mechanism front-planet carrier 42, the convergence mechanism front-ring gear 43, and the clutch $C_5$ and is output from the output shaft 5; in this case, the input-output relationship satisfies the following formula:

$$n_o = -\frac{k_3 + 1}{k_3 i_3 i_6 i_8} n_I. \tag{18}$$

In the formulas (1) to (18), $i_1 i_2 = 1$, $i_3 = i_4 i_5 = 1$, $i_1 i_9 = 1$, $k_1 = 1.56$, $k_2 = 2.56$, $k_3 = 1.56$, $k_4 = 2.56$, $i_6 i_8 = 1.76$, $i_7 i_8 = 2.52$.

Different pump-controlled motor mechanisms are selected according to speed regulation range and speed regulation accuracy, and the multi-pump driving mechanism consisting of the first forward variable displacement pump $P_1$ of a small flow, the second forward variable displacement pump $P_2$ of a large flow, the first reverse variable displacement pump $P_3$ of a small flow, and the second reverse variable displacement pump $P_4$ of a large flow that are connected in parallel is controlled by a programmed controller to supply oil to the system, thereby obtaining multiple combinations in forward and reverse directions.

When the displacement ratio is required to fall in a range of $|e| \in [0, 0.5]$ and the measured input speed of the pump $n_p$ is in a forward direction, only the first forward variable displacement pump $P_1$ is working; if oil output by the first forward variable displacement pump $P_1$ passes through the right position of the three-position four-way reversing valve $V_4$ 34 to drive the fixed displacement motor mechanism 32, the output speed of the motor $n_M$ is in a range of $n_M \in [0, 0.5]|n_p|$; and if oil output by the first forward variable displacement pump $P_1$ passes through the left position of the three-position four-way reversing valve $V_4$ 34 to drive the fixed displacement motor mechanism 32, the output speed of the motor $n_M$ is in a range of $n_M \in [-0.5, 0]|n_p|$.

When the displacement ratio is required to fall in a range of $|e| \in [0, 1.0]$ and the measured input speed of the pump $n_p$ is in a forward direction, only the second forward variable displacement pump $P_2$ is working; if oil output by the second forward variable displacement pump $P_2$ passes through the right position of the three-position four-way reversing valve $V_4$ 34 to drive the fixed displacement motor mechanism 32, the output speed of the motor $n_M$ is in a range of $n_M \in [0, 1.0]|n_p|$; and if oil output by the second forward variable displacement pump $P_2$ passes through the left position of the three-position four-way reversing valve $V_4$ 34 to drive the fixed displacement motor mechanism 32, the output speed of the motor $n_M$ is in a range of $n_M \in [-1.0, 0]|n_p|$.

When the displacement ratio is required to fall in a range of $|e| \in [0, 1.5]$ and the measured input speed of the pump $n_p$ is in a forward direction, the first forward variable displacement pump $P_1$ and the second forward variable displacement pump $P_2$ are both working; if oil output by the above two pumps passes through the right position of the three-position four-way reversing valve $V_4$ 34 to drive the fixed displacement motor mechanism 32, the output speed of the motor $n_M$ is in a range of $n_M \in [0,1.5]|n_p|$; and if oil output by the above two pumps passes through the right position of the three-position four-way reversing valve $V_4$ 34 to drive the fixed displacement motor mechanism 32, the output speed of the motor $n_M$ is in a range of $n_M \in [-1.5, 0]|n_p|$.

When the displacement ratio is required to fall in a range of $|e| \in [0,0.5]$ and the measured input speed of the pump $n_p$ is in a reverse direction, only the first reverse variable displacement pump $P_3$ is working; if oil output by the first reverse variable displacement pump $P_3$ passes through the right position of the three-position four-way reversing valve $V_4$ 34 to drive the fixed displacement motor mechanism 32, the output speed of the motor nu is in a range of $n_M \in [0,0.5]|n_p|$; and if oil output by the first reverse variable displacement pump $P_3$ passes through the left position of the three-position four-way reversing valve $V_4$ 34 to drive the fixed displacement motor mechanism 32, the output speed of the motor $n_M$ is in a range of $n_M \in [-0.5,0]|n_p|$.

When the displacement ratio is required to fall in a range of $|e| \in [0,1.0]$ and the measured input speed of the pump $n_p$ is in a reverse direction, only the second reverse variable displacement pump $P_4$ is working; if oil output by the second reverse variable displacement pump $P_4$ passes through the right position of the three-position four-way reversing valve $V_4$ 34 to drive the fixed displacement motor mechanism 32, the output speed of the motor $n_M$ is in a range of $n_M \in [0,1.0]|n_p|$; and if oil output by the second reverse variable displacement pump $P_4$ passes through the left position of the three-position four-way reversing valve $V_4$ 34 to drive the fixed displacement motor mechanism 32, the output speed of the motor $n_M$ is in a range of $n_M \in [-1.0,0]|n_p|$.

When the displacement ratio is required to fall in a range of $|e| \in [0,1.5]$ and the measured input speed of the pump $n_p$ is in a reverse direction, the first reverse variable displacement pump $P_3$ and the second reverse variable displacement pump $P_4$ are both working; if oil output by the above two pumps passes through the right position of the three-position four-way reversing valve $V_4$ 34 to drive the fixed displacement motor mechanism 32, the output speed of the motor $n_M$ is in a range of $n_M \in [0,1.5]|n_p|$; and if oil output by the above two pumps passes through the left position of the three-position four-way reversing valve $V_4$ 34 to drive the fixed displacement motor mechanism 32, the output speed of the motor $n_M$ is in a range of $n_M \in [-1.5,0]|n_p|$.

Full-range speed regulation is implemented through hydro-mechanical split transmission:
In the formula $$n_o = \frac{3.56}{2.52 + \frac{6.4512}{e}} n_I, \quad (7)$$

when $e \in [0, 1.0]$, $n_o \in [0, 0.397]n_1$;
that is, a mode g of forward low-speed fine regulation is adopted, wherein the output speed is in a range of $n_o \in [0, 0.397]n_1$;
in the formula $$n_o = \frac{3.56}{1.76 + \frac{4.5056}{e}} n_I, \quad (8)$$

when $e \in [0, 1.5]$, $n_o \in [0, 0.747]n_1$;
that is, a mode h of forward high-speed coarse regulation is adopted, wherein the output speed is in a range of $n_o \in [0, 0.747]n_1$;
in the formula $$n_o = -\frac{1}{6.4512 + \frac{3.9312}{e}} n_I, \quad (9)$$

when $e \in [0, 1.0]$, $n_o \in [-0.096, 0]n_1$;
that is, a mode i of reverse low-speed fine regulation is adopted, wherein the output speed is in a range of $n_o \in [-0.096, 0]n_1$;
in the formula $$n_o = -\frac{1}{4.5056 + \frac{2.7456}{e}} n_I, \quad (10)$$

when $e \in [0, 1.5]$, $n_o \in [-0.158, 0]n_1$;
that is, a mode j of reverse high-speed coarse regulation is adopted, wherein the output speed is in a range of $n_o \in [-0.158, 0]n_1$.

Staged stepless speed regulation is implemented through hydraulic transmission, hydro-mechanical convergence transmission, and mechanical transmission:
The formula (1) $n_o = e n_1$ and the formula $$n_o = \frac{2.56 + e}{8.9712} n_I \quad (11)$$

are associated, wherein
1. when $e = 0.321 \in [0, 0.5]$, a common point $n_o = 0.321 n_1$ is obtained;
2. as for the formula (11), $n_o \in [0.285, 0.341]n_1$;
3. when $e = 0$, a mechanical gear is obtained, and the formula (15) $n_o = 0.285 n_1$ is satisfied;
that is, a mode a is adopted for hydraulic forward low-speed startup; when $n_o = 0.321 n_1$, the mode is switched to a mode k; with the changes of e, efficient stepless speed variation is implemented; and when $e = 0$, the mode is switched to a mode o;
the formula (3) $n_o = e n_1$ and the formula $$n_o = \frac{2.56 - e}{2.7456} n_I \quad (12)$$

are associated, wherein
1. when $e = 0.683 \in [0, 1.5]$, a common point $n_o = 0.683 n_1$ is obtained;
2. as for the formula (12), $n_o \in [0.386, 0.932]n_1$;
3. when $e = 0$, a mechanical gear is obtained, and the formula (16) $n_o = 0.932 n_1$ is satisfied;

that is, a mode c is adopted for hydraulic forward high-speed startup; when $n_o=0.683n_1$, the mode is switched to a mode 1; with the changes of e, efficient stepless speed variation is implemented; and when e=0, the mode is switched to a mode p;

the formula (4) $n_o=en_1$ and the formula $$n_o = \frac{-2.56+e}{8.9712}n_1 \quad (13)$$

are associated, wherein
1. when $e=-0.321\epsilon[-0.5, 0]$, a common point $n_o=-0.321n_1$ is obtained;
2. as for the formula (13), $n_o \epsilon[-0.341, -0.285]n_1$;
3. when e=0, a mechanical gear is obtained, and the formula (17) $n_o=-0.285n_1$ is satisfied;

that is, a mode d is adopted for hydraulic reverse low-speed startup; when $n_o=-0.321n_1$, the mode is switched to a mode m; with the changes of e, efficient stepless speed variation is implemented; and when e=0, the mode is switched to a mode q;

the formula (6) $n_o=en_1$ and the formula $$n_o = -\frac{2.56+e}{2.7456}n_1 \quad (14)$$

are associated, wherein
1. when $e=-0.683\epsilon[-1.5, 0]$, a common point $n_o=-0.683n_1$ is obtained;
2. as for the formula (14), $n_o\epsilon[-0.932, -0.386]n_1$;
3. when e=0, a mechanical gear is obtained, and the formula (18) $n_o=-0.932n_1$ is satisfied;

that is, a mode f is adopted for hydraulic reverse high-speed startup; when $n_o=-0.683n_1$, the mode is switched to a mode n; with the changes of e, efficient stepless speed variation is implemented; and when e=0, the mode is switched to a mode r.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A multi-pump driven single-motor hydro-mechanical hybrid transmission device, comprising
an input shaft,
a planetary gear split mechanism,
a hydraulic transmission system,
a planetary gear convergence mechanism, and
an output shaft;
wherein
the input shaft is connected to the hydraulic transmission system and the planetary gear convergence mechanism through the planetary gear split mechanism;
the hydraulic transmission system and the planetary gear convergence mechanism are both connected to the output shaft;
the hydraulic transmission system comprises a multi-pump driving mechanism, a fixed displacement motor mechanism, and a hydraulic transmission output mechanism; wherein
the multi-pump driving mechanism is connected to the fixed displacement motor mechanism, the fixed displacement motor mechanism is connected to the planetary gear convergence mechanism, and the fixed displacement motor mechanism is connected to the output shaft through the hydraulic transmission output mechanism;
the multi-pump driving mechanism comprises two groups of variable displacement pump driving mechanisms, wherein the two groups of variable displacement pump driving mechanisms are connected in parallel and have opposite input directions, and the two groups of variable displacement pump driving mechanisms comprise a first forward input variable displacement pump driving mechanism, a second forward input variable displacement pump driving mechanism, a first reverse input variable displacement pump driving mechanism, and a second reverse input variable displacement pump driving mechanism;
a reversing valve is arranged between the multi-pump driving mechanism and the fixed displacement motor mechanism;
the first forward input variable displacement pump driving mechanism comprises a first variable displacement pump, a first check valve, a first pilot-operated relief valve, and a first solenoid valve; wherein
the first solenoid valve controls a control pressure of the first pilot-operated relief valve, and the first variable displacement pump is connected to the reversing valve through the first check valve;
the second forward input variable displacement pump driving mechanism comprises a second variable displacement pump, a second check valve, a second pilot-operated relief valve, and a second solenoid valve; wherein
the second solenoid valve controls a control pressure of the second pilot-operated relief valve, and the second variable displacement pump is connected to the reversing valve through the second check valve;
the first reverse input variable displacement pump driving mechanism comprises a third variable displacement pump, a third check valve, a third pilot-operated relief valve, and a third solenoid valve; wherein
the third solenoid valve controls a control pressure of the third pilot-operated relief valve, and the third variable displacement pump is connected to the reversing valve through the third check valve;
the second reverse input variable displacement pump driving mechanism comprises a fourth variable displacement pump, a fourth check valve, a fourth pilot-operated relief valve, and a fourth solenoid valve; wherein
the fourth solenoid valve controls a control pressure of the fourth pilot-operated relief valve, and the fourth variable displacement pump is connected to the reversing valve through the fourth check valve;
a jackshaft is arranged between the planetary gear split mechanism and the planetary gear convergence mechanism;
the planetary gear split mechanism comprises a split mechanism front-sun gear, a split mechanism front-planet carrier, a split mechanism rear-sun gear, a split mechanism rear-planet carrier, and a split mechanism shared ring gear; wherein
the input shaft is connected to the split mechanism front-sun gear and the split mechanism rear-planet carrier;

a first clutch is arranged between the split mechanism rear-planet carrier and the split mechanism rear-sun gear;

a second clutch is arranged between the split mechanism front-planet carrier and the jackshaft;

a third clutch is arranged between the split mechanism rear-sun gear and the jackshaft;

a fourth clutch is arranged between the split mechanism shared ring gear and the hydraulic transmission system;

the planetary ear convergence mechanism comprises a convergence mechanism shared sun gear, a convergence mechanism front-planet carrier, a convergence mechanism front-ring gear, a convergence mechanism rear-planet carrier, and a convergence mechanism rear-ring gear; wherein the jackshaft is connected to the convergence mechanism front-planet carrier, and the convergence mechanism front-planet carrier is connected to the convergence mechanism rear-ring gear;

a fifth clutch is arranged between the jackshaft and the convergence mechanism shared sun gear;

a sixth clutch is arranged between the convergence mechanism front-ring gear and the output shaft;

a seventh clutch is arranged between the convergence mechanism rear-planet carrier and the output shaft;

an eighth clutch is arranged between the hydraulic transmission output mechanism and the output shaft; and a brake is arranged between the fixed displacement motor mechanism and the hydraulic transmission output mechanism.

2. A control method of the multi-pump driven single-motor hydro-mechanical hybrid transmission device according to claim 1, comprising:

switching among a forward mode or a reverse mode and a high speed transmission mode or a low speed transmission mode of four transmission types comprising hydraulic transmission, hydro-mechanical split transmission, hydro-mechanical convergence transmission, and mechanical transmission through g selection of the first clutch, the second clutch, the third clutch, the fourth clutch, the fifth clutch, the sixth clutch, the seventh clutch, the eighth clutch, the brake, the first variable displacement pumps, the second variable displacement pump, the third variable displacement pump and the fourth variable displacement pump, and a combination control of the reversing valve; wherein in the hydraulic transmission, the first clutch, the fourth clutch, and the eighth clutch are engaged while the second clutch, the third clutch, the fifth clutch, the sixth clutch, the seventh clutch, and the brake are disengaged; power passes through the input shaft, the planetary gear split mechanism, and the hydraulic transmission system and the power is output from the output shaft; when the first clutch is engaged, the split mechanism rear-planet carrier and the split mechanism rear-sun gear of the planetary gear split mechanism are interlocked, the split mechanism rear-planet carrier and the split mechanism rear-sun gear rotate as a whole, and the power is transmitted through the split mechanism shared ring gear to the fourth clutch; and when the fourth clutch is engaged, the power is transmitted through the fourth clutch to the multi-pump driving mechanism, the fixed displacement motor mechanism, and the hydraulic transmission output mechanism of the hydraulic transmission system, and the power is finally transmitted through the eighth clutch and the power is output from the output shaft;

in the hydro-mechanical split transmission, the fourth clutch and the fifth clutch are engaged while the first clutch, the eighth clutch, and the brake are disengaged; the power passes through the input shaft to the planetary gear split mechanism and the power is split into two parts at the planetary gear split mechanism into the hydraulic transmission system and the jackshaft, and the two parts of the power are converged at the planetary gear convergence mechanism and then the two parts of the power are output from the output shaft;

in the hydro-mechanical convergence transmission, the first clutch and the fourth clutch are engaged while the fifth clutch, the eighth clutch, and the brake are disengaged; the power passes through the input shaft to the planetary gear split mechanism and the power is split into the two parts at the planetary gear split mechanism into the hydraulic transmission system and the jackshaft, and the two parts of the power are converged at the planetary gear convergence mechanism and then the two parts of the power are output from the output shaft;

in the mechanical transmission, the first clutch and the brake are engaged while the fourth clutch, the fifth clutch, and the eighth clutch are disengaged, and the reversing valve is in a middle position; the power sequentially passes through the input shaft, the planetary gear split mechanism, the jackshaft, and the planetary gear convergence mechanism and the power is then output from the output shaft.

3. The control method of the multi-pump driven single-motor hydro-mechanical hybrid transmission device according to claim 2, wherein in the hydraulic transmission, the reversing valve is switched to a right position during forward transmission;

the reversing valve is switched to a left position during reverse transmission;

the first reverse input variable displacement pump driving mechanism is switched on during low-speed fine regulation;

the second reverse input variable displacement pump driving mechanism is switched on during medium-speed regulation; and the first reverse input variable displacement pump driving mechanism and the second reverse input variable displacement pump driving mechanism are both switched on during high-speed coarse regulation.

4. The control method of the multi-pump driven single-motor hydro-mechanical hybrid transmission device according to claim 2, wherein in the hydro-mechanical split transmission, the reversing valve is switched to a right position;

the third clutch is engaged and the second clutch is disengaged during forward transmission;

the second clutch is engaged and the third clutch is disengaged during reverse transmission;

the seventh clutch is engaged and the sixth clutch is disengaged during low-speed fine regulation;

the sixth clutch is engaged and the seventh clutch is disengaged during high-speed coarse regulation;

the second reverse input variable displacement pump driving mechanism is switched on during forward low-speed fine regulation;

the first reverse input variable displacement pump driving mechanism and the second reverse input variable displacement pump driving mechanism are both switched on during forward high-speed coarse regulation;

the second forward input variable displacement pump driving mechanism is switched on during reverse low-speed fine regulation; and the first forward input variable displacement pump driving mechanism and the second forward input variable displacement pump driving mechanism are both switched on during reverse high-speed coarse regulation.

5. The control method of the multi-pump driven single-motor hydro-mechanical hybrid transmission device according to claim 2, wherein in the hydro-mechanical convergence transmission, the reversing valve is switched to a right position, the third clutch is engaged, and the second clutch is disengaged during forward transmission;

the reversing valve is switched to a left position, the econ clutch is engaged, and the third clutch is disengaged during reverse transmission;

the first reverse input variable displacement pump driving mechanism is switched on, the seventh clutch is engaged, and the sixth clutch is disengaged during low-speed fine regulation; and the first reverse input variable displacement pump driving mechanism and the second reverse input variable displacement pump driving mechanism are both switched on, the sixth clutch is engaged, and the seventh clutch is disengaged during high-speed coarse regulation.

6. The control method of the multi-pump driven single-motor hydro-mechanical hybrid transmission device according to claim 2, wherein in the mechanical transmission, the third clutch is engaged and the second clutch is disengaged during forward transmission;

the second clutch is engaged and the third clutch is disengaged during reverse transmission;

the seventh clutch is engaged and the sixth clutch is disengaged during low-speed transmission; and the sixth clutch is engaged and the seventh clutch is disengaged during high-speed transmission.

* * * * *